United States Patent [19]

Taguchi et al.

[11] Patent Number: 5,093,687
[45] Date of Patent: Mar. 3, 1992

[54] COPYING APPARATUS

[75] Inventors: Hiroshi Taguchi; Akira Igarashi, both of Toyko; Hiroyoshi Nakano, Saitama, all of Japan

[73] Assignee: Somar Corporation, Tokyo, Japan

[21] Appl. No.: 732,530

[22] Filed: Jul. 19, 1991

Related U.S. Application Data

[62] Division of Ser. No. 575,732, Aug. 31, 1990.

[30] Foreign Application Priority Data

Nov. 13, 1989 [JP] Japan .................................. 1-295828

[51] Int. Cl.⁵ ............................................. G03B 27/30
[52] U.S. Cl. ...................................... 355/106; 355/27
[58] Field of Search ........................... 355/106, 100, 27

[56] References Cited

U.S. PATENT DOCUMENTS 3,515,554 6/1970 Robillard ............................. 355/106

Primary Examiner—Monroe H. Hayes
Attorney, Agent, or Firm—Sughrue, Mion, Zinn, Macpeak & Seas

[57] ABSTRACT

A developing unit comprising a developing chamber having an upper film pass roller and a lower film pass roller, a gasifying chamber, and a heating chamber, discharging outlets connecting from the heating chamber to the developing chamber at upper and lower portions of the upper film pass roller, and sucking inlets connecting from the developing chamber to the gasifying chamber at upper and lower portions of the lower film pass roller, so that the surface area of each sucking inlet is made substantially equal to that of each discharging outlet. This improves convection efficiency of the hot blast and thus temperature differences between the upper and lower portions within the developing chamber thereby preventing tone variations of the copied images.

1 Claim, 5 Drawing Sheets

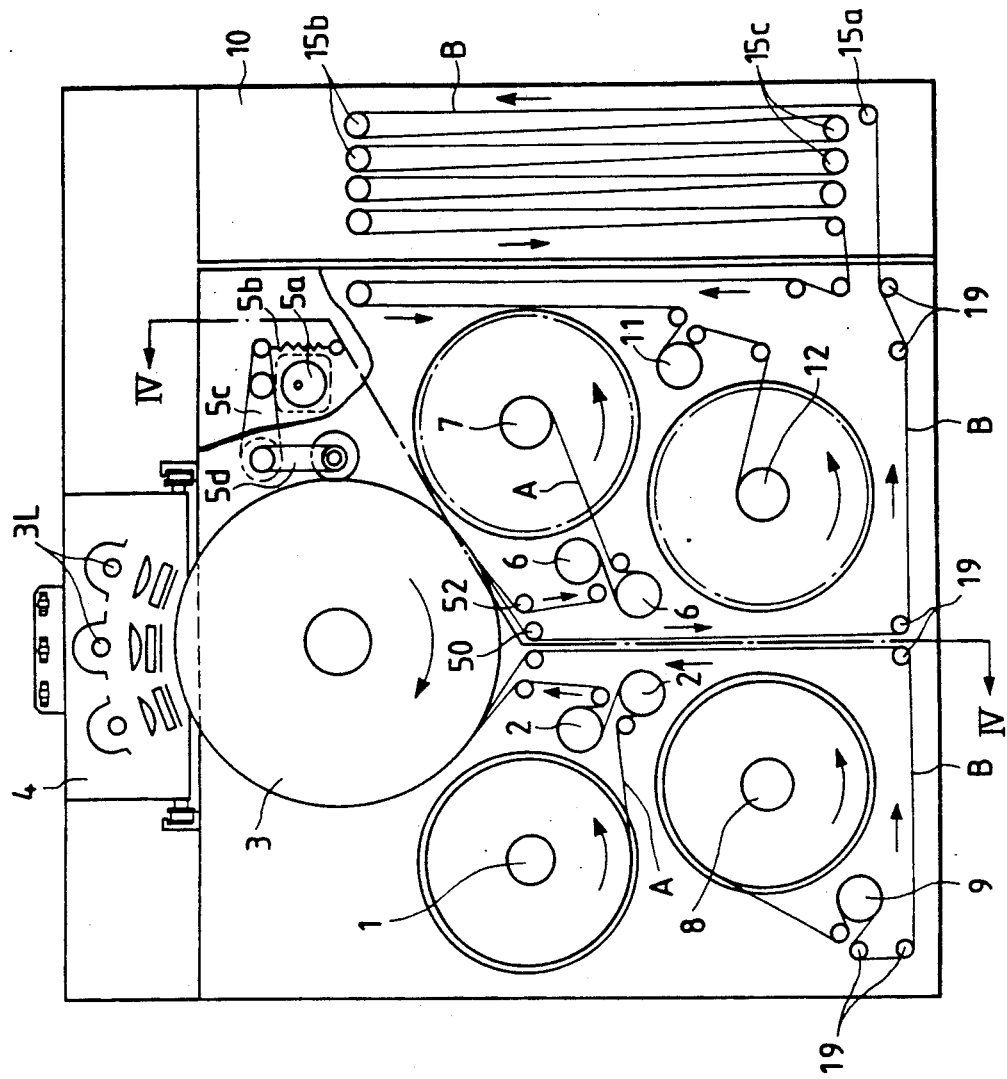

COPYING APPARATUS

This is a divisional of application No. 07/575,732 filed Aug. 31, 1990.

BACKGROUND OF THE INVENTION

This invention relates to copying apparatuses, and more particularly to microfilm copying apparatuses A microfilm copying apparatus by which a content is copied from a master film to an unexposed film involves a roll-formed master film (a silver salt film) and a roll-formed unexposed film (a silver salt film or a diazo film), and these films are brought into close contact with each other on the circumference of a printing drum to expose the unexposed film at a predetermined position thereon.

Such a microfilm copying apparatus comprises, as shown in FIG. 9 with a front view thereof a master unwind shaft 1 for unwinding a master film A; master brake rollers 2 for providing a braking force in a direction opposite to that of flow of the master film A; a printing drum 3 for providing contact and exposure; an exposing unit 4 for exposing a film; master pull rollers (drive and pull unit) 5 for pulling the master film A; a master rewind shaft 6 for rewinding the master film A; a diazo unwind shaft 7 for unwinding the unexposed film (e.g., a diazo film) B; a developing unit 8 for developing the exposed diazo film B; a diazo pull roller 9 for pulling the diazo film B; and a diazo rewind shaft 10 for rewinding the diazo film B.

The exposing unit 4 that serves to copy a content of the master film A to the diazo film B is located at a predetermined position on the circumference of the printing drum 3 so that light will be injected onto the film surface vertically.

The master film A is externally wound on the main surface of the diazo film B that is wound on the circumference of the printing drum 3.

In the above-described microfilm copying apparatus is constructed a tension is produced on the master film A wound on the circumference of the printing drum 3 by both a braking force derived mainly from the master brake rollers 2 and a drive force derived mainly from the master pull rollers 5. That is, the master film A is acted upon by a force directed toward the axis of the printing drum 3, or a centripetal force, and this centripetal force presses the diazo film B wound internally on the circumference of the printing drum 3, thereby improving the degree of contact between the master film A and the diazo film B.

However, the degree of contact depends on the tension defined by the drag and pulling forces of the master film A, and in the system of producing a tension by the forces of the master brake rollers 2 and the master pull rollers 5 such as above, it is difficult to maintain the proper tension for the roll-formed master film A as its diameter varies from a maximum to a minimum (the diameter of the unwind roll will reduce by about 1/5 the original diameter and that of the rewind roll will increase by about 5 times the original). In such a case, a measure to reducing tensile variations by increasing the tension of the master film A is not a satisfactory solution in that it causes deformation of the master film A including elongation and damage and thus causes nonuniform contact between the master film A and the diazo film B with resultant blurs in a copied image.

Further, the speed of the master film A is, on the one hand, determined by the difference between the drag and pulling forces of the master film A. On the other hand, the speed of the diazo film B is determined by a portion of difference between the drag force of the unexposed film B (a braking force of the diazo film B and a frictional force between the diazo film B and the printing drum 3 and the pulling force (a drive force derived mainly from the diazo pull roller 9) and a portion depending on the speed of the master film A taking into account the frictional force defining the degree of contact between both films A and B. In addition, the printing drum 3 is an idle drum, which is also subject to a drive by the frictional force between the diazo film B and the printing drum 3 caused due to the tension of each of the films A and B. Therefore, in such a system the stability of the speed of the master film A achieved by accurately controlling the speed of the master pull rollers 5 would not contribute to eliminating the fluctuations of the degree of contact, thereby causing differences in speed between both films and producing shifts in the copied image. This imposes a restriction on the utilization of the apparatus; i.e., a copying can be made only at lower speeds (6 m/min or lower) where speed differences are insignificant.

Still further, the developing unit 8 for developing the diazo film B cannot provide sufficient circulation of the hot blast that contains a mixture of an ammonia gas and steam due to a large difference in surface area between the upper and lower vent holes. As a result, there exists a temperature difference of about 35° C. between both vent holes (about 115° C. at the upper vent hole and about 80° C. at the lower vent hole), thereby causing variations in tone at the initial, intermediate, and end phase during the development of the diazo film B.

This invention has been made to overcome the above problems.

An object of this invention, therefore, is to provide a microfilm copying machine for copying a content from a master film to an unexposed film capable of preventing copied images from being blurred, shifted, or subjected to tone variations.

SUMMARY OF THE INVENTION

Some aspects of this invention will be summarized below.

A first aspect of the invention concerns a copying apparatus comprising a master brake roller, a master pull roller, a printing drum, and a nip roller. A tension is produced on a master film by the master brake roller and the master pull roller to cause the master film to come in close contact with an unexposed film wound on the circumference of the printing drum. The unexposed film is exposed at a predetermined position on the circumference of the printing drum and a content of the master film is copied to the unexposed film in an equal size. The nip roller is disposed at the delivery end of an exposing unit located on the circumference of the printing drum so as to bring both the master film and the unexposed film into a pressure contact with each other on the circumference of the printing drum and the printing drum is driven by a motor under such condition.

A second aspect of this invention concerns a developing unit, which has a developing chamber having an upper film pass roller and a lower film pass roller for transferring an exposed film in zigzag, a gasifying chamber having a blower for blowing air containing an ammonia gas and steam produced by gasifying aqueous ammonia, and a heating chamber for heating the air containing the ammonia gas and the steam, whereby the air containing the ammonia gas and the steam is circulated by the blower to develop the exposed film. The developing unit has discharging outlets connecting from the heating chamber to the developing chamber at upper and lower portions of the upper film pass roller, and sucking inlets connecting from the developing chamber to the gasifying chamber at upper and lower portions of the lower film pass roller The surface area of each of the sucking inlets is made substantially equal to that of each of the discharging outlets According to the first aspect of the invention, a tension is produced between the nip roller and the master brake roller and the printing drum is driven by the motor under such condition. This causes the master film and the unexposed film (diazo film) to be in closer contact with each other on the circumference of the printing drum. As a result, the tensile variations of the master film can be reduced to prevent copied images not only from being blurred but also from being shifted due to differences in speeds of the films.

According to the second aspect of the invention, the surface area of the discharging outlet is made substantially equal to that of the sucking inlet. This improves the convection efficiency of the hot blast containing the gasified ammonia gas and the steam and thus contributes to reducing differences in temperature between the upper and lower portions within the developing chamber, thereby preventing tone variations of the copied images.

The above and other objects and novel features of this invention will become apparent from the following description of an embodiment with reference to the accompanying drawings

BRIEF DESCRIPTION OF THE DRAWINGS

FIG. 2 is a front view showing the main portion of the microfilm copying apparatus;

FIG. 3 is a left side view of FIG. 2;

DETAILED DESCRIPTION OF THE PREFERRED EMBODIMENT

Figure 1:
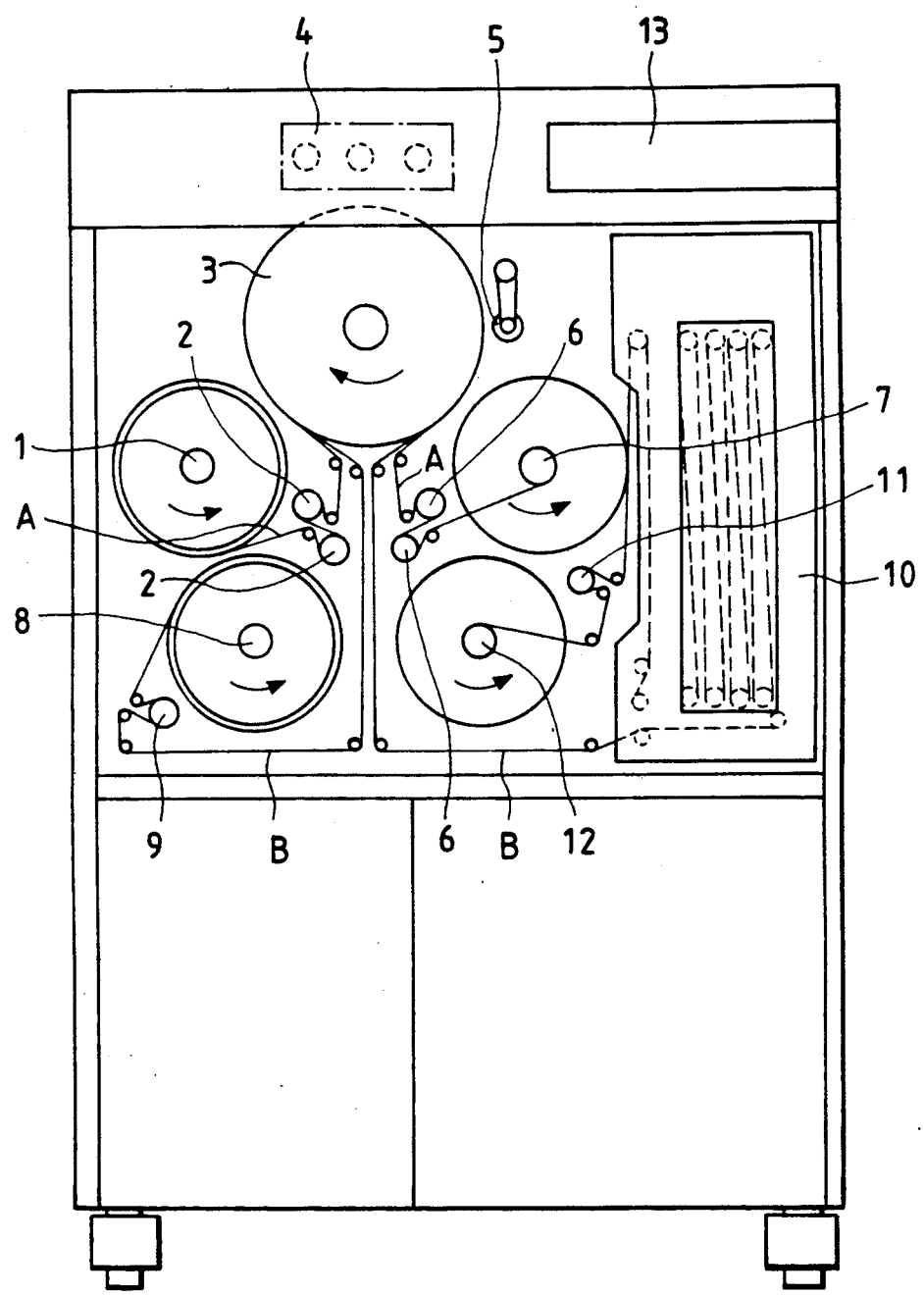
FIG. 1 is a front view showing a microfilm copying apparatus that is an embodiment of this invention.

An embodiment of the present invention will now be described in detail with reference to the accompanying drawings.

Like reference numerals and characters designate corresponding parts and components in all the drawings and the descriptions thereof will be omitted.

FIG. 1 is a front view schematically showing the construction of a microfilm copying apparatus for copying an identical content from a master film (a silver salt film) to an unexposed film (a silver salt film or a diazo film), which is an embodiment of this invention.

As shown in FIG. 1, the microfilm copying apparatus comprises: a master unwind shaft 1; master brake rollers 2; a printing drum 3; an exposing unit 4; a nip roller 5 for bringing the master film A and the unexposed film, e.g., a diazo film B into pressure contact with the circumference of the printing drum 3; master pull rollers 6; a master rewind shaft 7; a diazo unwind shaft 8; a diazo brake roller 9; a developing unit 10; a diazo pull roller 11; a diazo rewind shaft 12; and an operating panel 13.

The specific construction of such a microfilm copying apparatus will be described with reference to FIGS. 2, 3, and 4. FIG. 2 is a plan view showing the main portion of FIG. 1; FIG. 3 is a left side view of FIG. 2; and FIG. 3 is a side view taken along line A—A of FIG. 2.

As shown in these figures, the master unwind shaft 1 is formed of a rod member whose diameter is about 26 mm and can be loaded with a rolled film of 16-35 mm in width and 235 mm in maximum diameter. In order to apply a predetermined tension to the master film A during the unwinding thereof, the master unwind shaft 1 causes a master shaft drive motor M1 (FIG. 3) to rotate in a direction opposite to that of flow of the master film A so that the master unwind shaft 1 will be braked.

Figure 4:
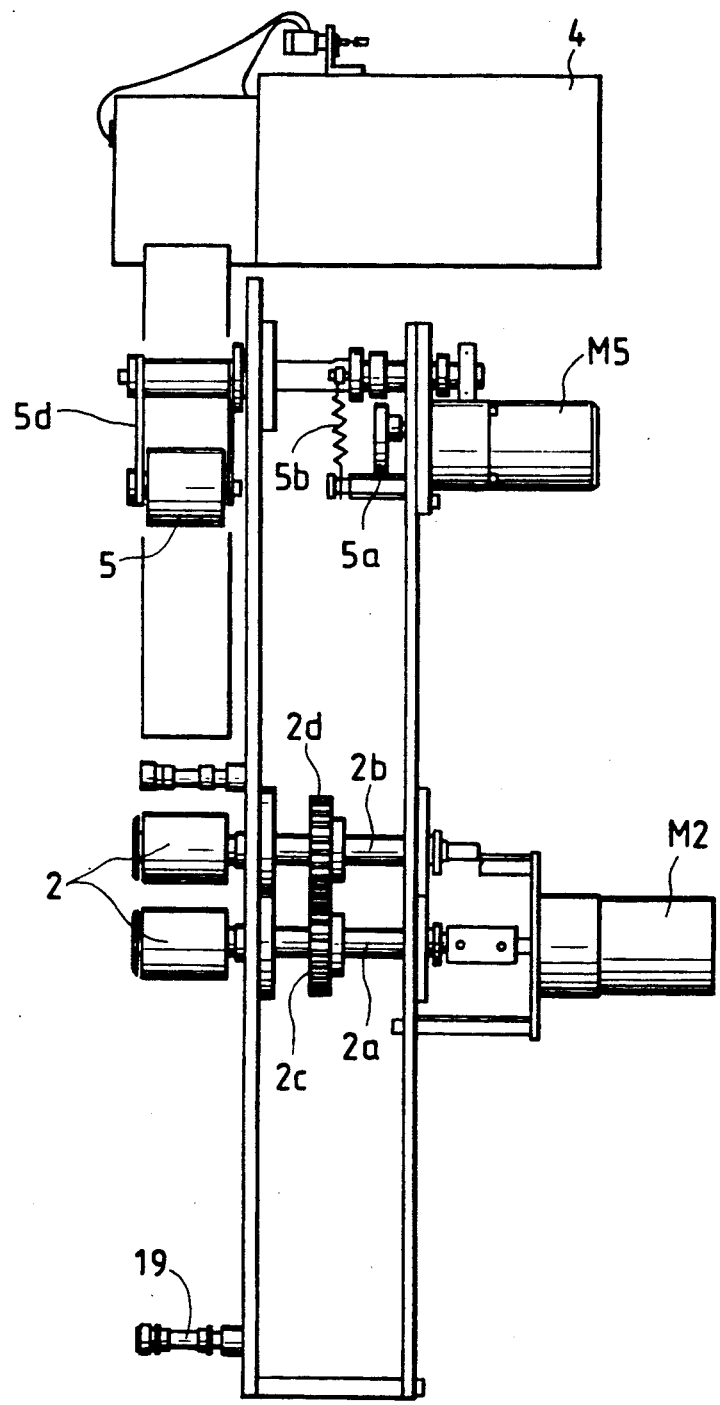
FIG. 4 is a sectional view taken along line A—A of FIG. 2.

As shown in FIGS. 2 and 4, each of the master brake rollers 2, disposed at two separate locations, is of 50 mm in diameter and formed of a rubber roller whose length is substantially equal to the width (thickness) of the printing drum 3. During exposure the master brake rollers 2 causes a brake motor M2 to operate on a master brake roller shaft 2a and another master brake roller shaft 2b through gears 2c and 2d so that the shafts 2a, 2b will be rotated in a braking direction. The master film A is installed in S form (S lap) along the master brake rollers 2 so that a predetermined tension can be provided on the master film A wound around the printing drum 3 between the master brake rollers and the nip roller 5. The braking force acting to apply a predetermined tension to the master film A is controlled by an operation switch located on the operation panel 13 (FIG. 1) depending on the width and thickness of the film.

As shown in FIGS. 2 and 3, the printing drum 3 serves to bring the master film A and the diazo film B into uniform contact with each other over an extensive range and is of disk form so that the films will be transferred smoothly. Its circumferential portion with which the films come into contact is formed of a cylindrical member having a smooth curved surface whose width (thickness) is in the range of 1.5-2 times the maximum film width. A rotary shaft 3a of this printing drum 3 is driven by a printing drum drive motor M3 to transfer the films. Of course, it is possible to modify this arrangement so that the motor M3 is dispensed with and instead thereof, tension rollers 50 and 52 are rotated by another motor (not shown) through a well known gear mechanism (not shown)

The exposing unit 4 irradiates light toward the axis of the printing drum 3 from a light source 3L (lamps) and expose the film located below the light source on the circumference of the printing drum 3. Three pieces of a metal halide lamp are used as the light source 3L.

As shown in FIGS. 2 and 4, the nip roller 5 is 55 mm in diameter and formed of a rubber roller whose length is about 10% shorter than the width (thickness) of the printing drum 3. At the start of the exposure, a motor M5 rotates a cam 5a by half a rotation to pull down the right end of a horizontally located swing arm 5c by a spring 5b, thereby causing the nip roller 5 mounted on a roller arm 5d to bring the master film A and the diazo film B into pressure contact with each other between the printing drum 3 and the nip roller 5. The roller arm 5d hangs vertically from the left end of the swing arm 5c. This causes a tension to be produced between the master brake rollers 2 and the nip roller 5 assisted by the driving force of the printing drum 3 and, as a result, the master film A and the diazo film B are brought into closest contact with each other. Additionally, the master film A and the diazo film B are prevented from being slipped by tensile variations during rewinding.

As shown in FIG. 2, the master pull rollers 6 have the same construction as the master brake rollers 2 (FIG. 4) except for the brake motor M2 in latter being used as a drive motor in the former. On the master pull rollers 6 the master film A is installed in S form to be stretched with a predetermined tension and this, assisting the drive of the printing drum 3, contributes to reducing rotational errors of the film. These rollers 6 also allow tension variations of the master rewind shaft 7 to be alleviated, thereby preventing copied images from being blurred. The tension at the master pull rollers 6 is controlled by an operation switch located on the operating panel 13 (FIG. 1) depending on the width and thickness of the film.

The master rewind shaft 7 has the same construction as the master unwind shaft 1 and can rewind films of 16-35 mm in width and 235 mm in maximum diameter, similar to the master unwind shaft 1. When rewinding the master film A, a master rewind shaft motor (not shown) is driven to provide a predetermined tension so that the master film A forwarded by the master pull rollers 6 will not be collapsed.

As shown in FIGS. 2 and 3, the diazo unwind shaft 8 has the same construction as the master unwind shaft 1. The diazo unwind shaft 8 is braked by rotating a diazo unwind shaft motor M8 in a direction opposite to that of flow of the diazo film B so that a predetermined tension will be provided to the diazo film B.

As shown in FIGS. 2 and 3, the diazo brake roller 9 is formed of a single rubber roll employing the same member as the master brake roller 2 During exposure, a shaft 9a is driven by a brake motor M9, similar to the master brake rollers 2, to install the diazo film B in C form (C lap) and is operated in the same way as in the master brake rollers 2.

As shown in FIG. 2, the developing unit 10 serves to develop an exposed diazo film. Within the developing unit 10 is a circulating hot blast containing an ammonia gas and steam. The exposed diazo film B is subjected to development on its way of passing over pass rollers 15a, 15b, and 15c.

The diazo pull roller 11 has the same construction as the diazo brake roller 9 except for the brake motor M9 in the latter used as a drive motor in the former. On the diazo pull roller 11 the diazo film B is installed in C form and the developed diazo film B is stretched under a predetermined tension in order to prevent its tensile variations caused during its passage within the developing unit 10 from affecting the rewinding of the film. At the same time, this predetermined tension applied to the developed diazo film B also serves to maintain the tension of the exposed diazo film B that is departing from the printing drum 3 substantially constant.

The diazo rewind shaft 12 has the same construction as the master rewind shaft 7, and, similar to the shaft 7, serves to rewind the diazo film B with a predetermined tension so that the developed diazo film B transferred from the diazo pull roller 11 will not be collapsed during the rewinding.

Figure 7:
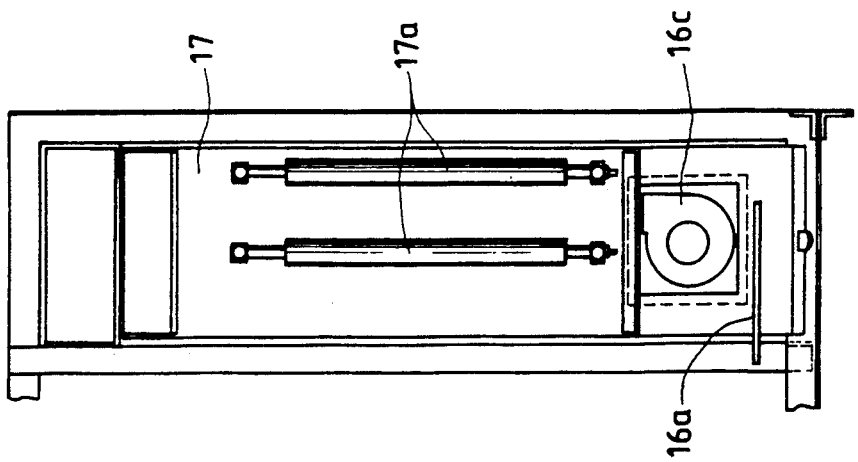
FIG. 7 is a sectional view taken along line C-C of FIG. 6.
Figure 6:
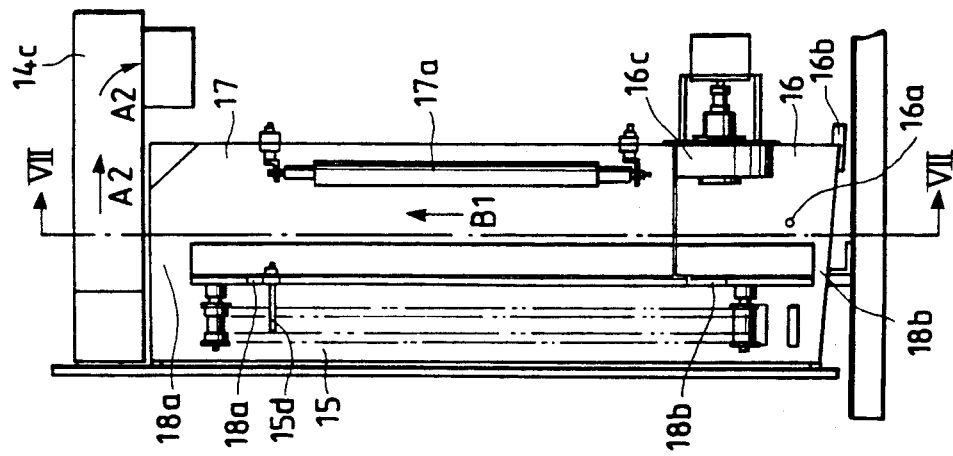
FIG. 6 is a sectional view taken along line B-B of FIG. 5.

The specific construction of the developing unit 10 that serves to develop an exposed diazo film B will be described with reference to FIGS. 5 to 7.

Figure 5:
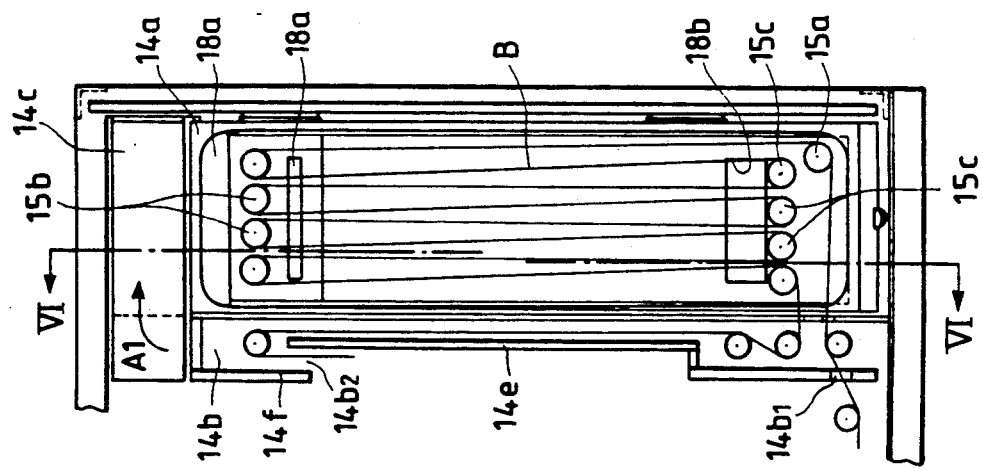
FIG. 5 is a plan view showing a developing unit in FIG. 1.

FIG. 5 is a front view of the developing unit; FIG. 6 is a section view taken along line B—B of FIG. 5; and FIG. 7 is a sectional view taken along line C—C of FIG. 6.

As shown in these figures, the developing unit 10 is formed of a box 14a of rectangular parallelopiped whose lateral sides excluding a front aluminum plate door 14d are made of a stainless material. The developing unit 10 comprises a developing chamber 15, a gasifying chamber 16, and a heating chamber 17. On the left lateral surface of the developing chamber 15 is a plate 14e made of a phenol resin provided outside the rectangular-parallelopiped box 14a to arrange an exhaust zone 14b together with an aluminum member 14f. On the exhaust zone 14b are an inlet $14b_1$ on a lower portion and an outlet $14b_2$ on an upper portion for introducing and discharging the exposed diazo film B. An upper portion of the exhaust zone 14b is in communication with an exhaust duct chamber 14c, outside the unit through paths in respective directions indicated by arrows A1 and A2 by means of an exhaust fan (not shown).

The gasifying chamber 16 is provided with a stainless tube 16a for dripping in aqueous ammonia from outside and a stainless tube 16b for discharging the aqueous ammonia to outside. The aqueous ammonia dripped into the gasifying chamber 16 is gasified to be an ammonia gas and steam. Air containing the gasified ammonia gas and the steam is blown into the heating chamber 17 by a blower 16c.

The heating chamber 17 carries vertically two heaters with a fin 17a, between which the ammonia gas and the steam blown from the gasifying chamber 16 by the blower 16c are flown from bottom upward as indicated by arrow B1 thereby to become temperate air.

The temperate air is introduced into the developing chamber 15 passing through two outlets 18a located on the heating chamber 17.

Within the developing chamber 15 are an upper film pass roller 15b and lower film pass rollers 15c and 15a, each of which is of 25 mm in diameter and idle, arrayed at predetermined positions respectively. The developing chamber 15 also has a temperature control sensor 15d for detecting the temperate air immediately after its entry into the developing chamber 15 from the heating chamber 17. This sensor 15d is to control the temperature of the heaters 17a. The entered temperate air flows downward within the developing chamber 15 and is sucked into two suction inlets 18b located at a lower portion of the developing chamber 15. These inlets 18b, 18b introduces the air into the gasifying chamber 16. The temperate air sucked into the gasifying chamber 16, mingled with the gasified ammonia gas and the steam, is sent back to the heating chamber 17 by the blower 16c. That is, the temperate air circulates through the three chambers to become hot blast of 95-100° C. within 5 minutes.

On the other hand, the film entered from the film inlet $14b_1$ located at the lower portion of the developing chamber 15 passes through the film pass rollers 15a, 15b, 15c making a zigzag in vertical direction and returns to the exhaust zone 14b. The film passing through the pass rollers 15a, 15b, 15c vertically making a zigzag receives the hot blast, thereby giving rise to color on the film through chemical reaction of a diazo compound applied to the film with the ammonia gas and the steam under a predetermined temperature. That is, the film is developed.

Figure 8:
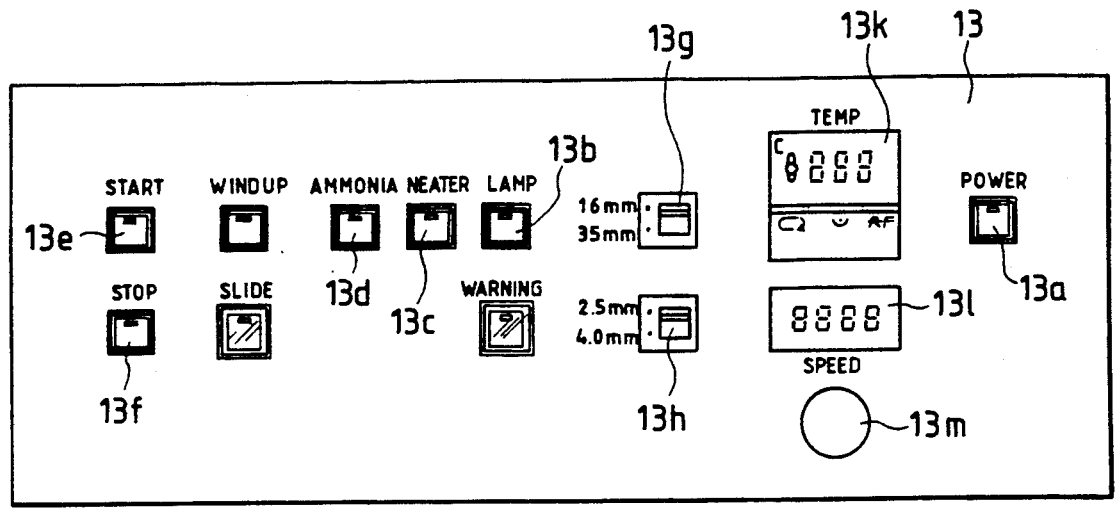
FIG. 8 is a plan view showing an operating unit in FIG. 1.
Figure 9:
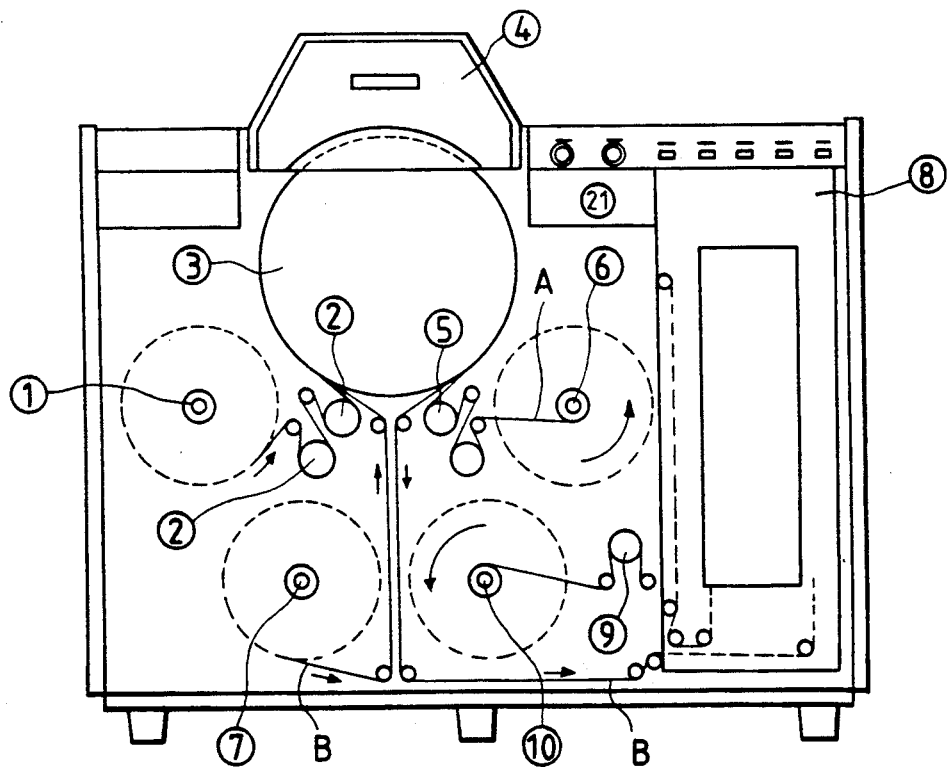
FIG. 9 is a plan view showing a conventional microfilm copying apparatus.

The operating unit 13 will now be described in detail with reference to FIG. 8 showing the front view thereof.

A power switch 13a, an exposure light source switch 13b, a heater switch 13c, and an ammonia switch 13d located on the operating panel 13 of the copying apparatus are sequentially turned on to cause ammonia to drip into the gasifying chamber 16 (FIG. 6) thereby to complete a warm-up.

About 5 minutes later, when the light source for exposure is stabilized and the developing chamber 15 is heated to a predetermined temperature (95° C.), the state of the apparatus proceeds from a warm-up to a stand-by. At this point, a start switch 13e is pressed to operate the apparatus. Upon turning on the start switch 13e, the master unwind shaft 1, the diazo unwind shaft 8, the master brake rollers 2, the diazo brake roller 9 are braked respectively, while the master rewind shaft 7, the diazo rewind shaft 12, the master pull rollers 6, the diazo pull roller 11, and the printing drum 3 are rotated with driving forces applied thereto respectively. At the same time, the light source 3L located in the exposing unit 4 moves right above the film on the circumference of the printing drum 3 and the arm 5d of the nip roller 5 is also moved to bring both overlapped films A and B into pressure contact with the printing drum 3. The films A and B wound around the printing drum 3 are transferred by the pressure contact of the nip roller 5 and rotation of the printing drum 3. As described previously, a tension is produced on the master film A, and the master film A is then presses the diazo film B wound around the inner surface thereof onto the drum thereby to cause both films A and B to be in close contact with each other. The master film A forwarded from the printing drum 3 is rewound by the master rewind shaft 7 via the master pull rollers 6. On the other hand, the diazo film B is drawn into the developing unit 10 by the diazo pull roller 11 along guide rollers 19. The diazo film B entered into the developing unit 10 is developed by the circulating hot blast at about 95° C. containing the ammonia gas and the steam. The diazo film B that has been pulled out by the diazo pull roller 11 is rewound around a bobbin by the diazo rewind shaft 12. The above operation will be continued until a roll of film is copied. Upon completion of the rewinding of the film, the drive mechanisms will be stopped automatically.

Thus, the microfilm copying apparatus is constructed so that a tension is produced by the master brake rollers 2 and the master pull rollers 6 and is applied to cause the master film A to be in contact with the upper surface of the diazo film B wound around the printing drum 3, and under this condition, the diazo film B is exposed at a predetermined position around the printing drum 3 thereby to copy a content from the master film to the diazo film with the size equal to the original. In such a microfilm copying apparatus, the nip roller 5 for bringing the master film A and the diazo film B into a pressure contact with the circumference of the printing drum 3 is provided at the delivery end of the exposing unit 4 located on the circumference of the printing drum 3 and the printing drum 3 is driven by the motor M3. As a result of this construction, a tension is produced on the master film A between the nip roller 5 and the master brake rollers 2, and as the printing drum 3 is driven by the drive motor M3, the degree of contact between the master film A and the diazo film B wound around the printing drum 3 can be improved, and this further contributes to reducing the tensile variations of the master film A, and prevents the copied images from being blurred or shifted due to speed differences between the films.

Further, the developing unit comprises the developing chamber 15 having both the upper film pass roller 15b and the lower film pass roller 15c, the gasifying chamber 16 having the blower 16c for blowing the air containing the ammonia gas and steam produced by gasifying aqueous ammonia, and the heating chamber 17 for heating the air containing the ammonia gas and the steam, and develops the exposed film by circulating the heated air containing the ammonia gas and the steam by the blower 16c. In such a developing unit, the discharging outlets (upper vent holes) 18a guiding from the heating chamber 17 to the developing chambers 15 are provided at two points on the upper and lower portions of the upper film pass roller 15b and the sucking inlets (lower vent holes) 18b, at two points on the upper and lower portions of the lower film pass roller 15c, thereby making the surface area of each of the discharge outlets 18a substantially equal to that of each of the sucking inlets 18b. As a result of this construction, the convection efficiency of the air containing the gasified ammonia gas and the steam can be improved, thereby reducing temperature differences between the upper and lower portions within the developing chamber 15 and preventing tone variations of the copied images.

Thus, as described above, this invention allows a microfilm copying apparatus of such type that the content of a master film is copied to an unexposed film to produce copied images free from being blurred, shifted, and subjected to variations in tone.

While this invention has been particularly shown and described with reference to its preferred embodiment, it will be understood that this invention is not be limited thereto but may be changed and modified in various ways within its spirit and scope as set out herein.

What is claimed is:

1. A developing unit comprising:
   a developing chamber having an upper film pass roller and a lower film pass roller, said upper film pass roller and said lower film pass roller transferring a film in zigzag;
   a gasifying chamber having a blower for blowing air containing an ammonia gas and vapor produced by gasifying aqueous ammonia;
   a heating chamber for heating said air containing the ammonia gas and steam, said air containing the ammonia gas and the steam being circulated by said blower to develop an exposed film;
   discharging outlets connecting from said heating chamber to said developing chamber at upper and lower portions of said upper film pass roller; and
   sucking inlets connecting from said developing chamber to said gasifying chamber at upper and lower portions of said lower film pass roller, the surface area of each of said sucking inlets being made substantially equal to that of each of said discharging outlets.

* * * * *